US008312092B2

(12) United States Patent
Rogers et al.

(10) Patent No.: US 8,312,092 B2
(45) Date of Patent: Nov. 13, 2012

(54) USE OF PERSISTENT SESSIONS BY A PRESENCE ACCESS LAYER

(75) Inventors: Jeffrey Christopher Rogers, Toronto (CA); Sin-Hang So, Richmond Hill (CA); Brian McColgan, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/355,269

(22) Filed: Jan. 20, 2012

(65) Prior Publication Data

US 2012/0117175 A1    May 10, 2012

Related U.S. Application Data

(63) Continuation of application No. 12/252,221, filed on Oct. 15, 2008, now Pat. No. 8,103,730.

(51) Int. Cl.
*G06F 15/16* (2006.01)
(52) U.S. Cl. ........ 709/206; 709/203; 709/204; 709/227; 709/228
(58) Field of Classification Search ........... 709/203, 709/204, 207, 220; 455/67.11, 418, 435.1, 455/64.11; 379/265.02
See application file for complete search history.

(56) References Cited

U.S. PATENT DOCUMENTS

| 5,307,228 | A  | 4/1994  | Grasty |
| 6,757,722 | B2 | 6/2004  | Lonnfors et al. |
| 6,928,294 | B2 | 8/2005  | Maggenti et al. |
| 6,965,767 | B2 | 11/2005 | Maggenti et al. |
| 7,043,538 | B2 | 5/2006  | Guedalia et al. |
| 7,187,935 | B1 | 3/2007  | Day |
| 7,206,934 | B2 | 4/2007  | Pabla et al. |
| 7,243,149 | B2 | 7/2007  | Kelley et al. |
| 7,246,371 | B2 | 7/2007  | Diacakis et al. |
| 7,337,465 | B2 | 2/2008  | Kiyoto et al. |
| 7,441,032 | B2 | 10/2008 | Costa Requena |
| 7,472,268 | B2 | 12/2008 | Gray |
| 7,551,925 | B2 | 6/2009  | Simongini et al. |
| 7,567,805 | B2 | 7/2009  | Cox et al. |
| 7,603,467 | B2 | 10/2009 | Malik et al. |
| 7,676,548 | B2 | 3/2010  | Oh et al. |
| 7,684,805 | B2 | 3/2010  | Zhao et al. |
| 7,697,950 | B2 | 4/2010  | Jin et al. |

(Continued)

FOREIGN PATENT DOCUMENTS

EP    1396975 A2    3/2004

(Continued)

OTHER PUBLICATIONS

Final Office Action dated Sep. 9, 2011, 20 pages, U.S. Appl. No. 12/253,102, filed Oct. 16, 2008.

(Continued)

*Primary Examiner* — Quang N. Nguyen
(74) *Attorney, Agent, or Firm* — Conley Rose, P.C.; J. Robert Brown, Jr.

(57) ABSTRACT

A method for a watcher to receive presence information. The method includes the watcher requesting presence information from a presence access layer and then disconnecting from the presence access layer. The method further includes the presence access layer receiving the requested information through a persistent session with a presence server, storing the requested information, and delivering the requested information to the watcher after the watcher reconnects to the presence access layer.

17 Claims, 6 Drawing Sheets

U.S. PATENT DOCUMENTS

| | | | |
|---|---|---|---|
| 7,702,753 | B2 | 4/2010 | Simongini et al. |
| 7,870,196 | B2 | 1/2011 | Costa Requena |
| 2001/0008404 | A1 | 7/2001 | Naito et al. |
| 2003/0028621 | A1 | 2/2003 | Furlong et al. |
| 2004/0015569 | A1 | 1/2004 | Lonnfors et al. |
| 2004/0032940 | A1 | 2/2004 | Gray |
| 2004/0123153 | A1 | 6/2004 | Wright et al. |
| 2004/0153506 | A1 | 8/2004 | Ito et al. |
| 2004/0158565 | A1 | 8/2004 | Kakuta et al. |
| 2004/0177134 | A1* | 9/2004 | Lonnfors et al. ............. 709/220 |
| 2004/0203432 | A1* | 10/2004 | Patil et al. ................. 455/67.11 |
| 2005/0068167 | A1* | 3/2005 | Boyer et al. ................. 340/531 |
| 2005/0135240 | A1 | 6/2005 | Ozugur |
| 2005/0198545 | A1 | 9/2005 | Wieck et al. |
| 2005/0221820 | A1 | 10/2005 | Ruetschi |
| 2005/0228895 | A1 | 10/2005 | Karunamurthy et al. |
| 2005/0232184 | A1 | 10/2005 | Borella |
| 2005/0262198 | A1* | 11/2005 | Leppanen et al. ............ 709/204 |
| 2005/0266859 | A1 | 12/2005 | Tejani et al. |
| 2006/0085844 | A1 | 4/2006 | Buer et al. |
| 2006/0101266 | A1 | 5/2006 | Klassen et al. |
| 2006/0136717 | A1 | 6/2006 | Buer et al. |
| 2006/0143646 | A1 | 6/2006 | Wu et al. |
| 2006/0165058 | A1 | 7/2006 | Caballero-McCann et al. |
| 2006/0165092 | A1 | 7/2006 | Wilson et al. |
| 2006/0195591 | A1 | 8/2006 | Kim et al. |
| 2006/0234735 | A1 | 10/2006 | Digate et al. |
| 2006/0239186 | A1 | 10/2006 | Wu |
| 2006/0280166 | A1 | 12/2006 | Morris |
| 2006/0286993 | A1 | 12/2006 | Xie et al. |
| 2007/0010275 | A1 | 1/2007 | Kiss |
| 2007/0042791 | A1 | 2/2007 | Walter |
| 2007/0123253 | A1 | 5/2007 | Simongini et al. |
| 2007/0150441 | A1 | 6/2007 | Morris |
| 2007/0150605 | A1 | 6/2007 | Christoffersson et al. |
| 2007/0168424 | A1 | 7/2007 | Oh et al. |
| 2007/0168449 | A1 | 7/2007 | Malik et al. |
| 2007/0182541 | A1* | 8/2007 | Harris et al. ................. 340/506 |
| 2007/0266076 | A1* | 11/2007 | Cox et al. ...................... 709/203 |
| 2007/0288621 | A1 | 12/2007 | Gundu et al. |
| 2007/0291761 | A1 | 12/2007 | Kauniskangas et al. |
| 2008/0010301 | A1 | 1/2008 | Tian et al. |
| 2008/0028211 | A1 | 1/2008 | Tanizawa et al. |
| 2008/0126541 | A1 | 5/2008 | Rosenberg et al. |
| 2008/0133742 | A1 | 6/2008 | Southiere et al. |
| 2008/0153538 | A1 | 6/2008 | O'Shaughnessy et al. |
| 2008/0183866 | A1 | 7/2008 | Maeda et al. |
| 2008/0205625 | A1* | 8/2008 | Mandalia et al. ........ 379/265.02 |
| 2008/0208953 | A1 | 8/2008 | Tian |
| 2008/0214170 | A1* | 9/2008 | Laflamme et al. ............ 455/418 |
| 2008/0285542 | A1 | 11/2008 | Jachner |
| 2008/0288649 | A1 | 11/2008 | Burckart et al. |
| 2008/0313321 | A1 | 12/2008 | Kiss et al. |
| 2009/0106677 | A1* | 4/2009 | Son et al. ...................... 715/764 |
| 2009/0319655 | A1 | 12/2009 | Viamonte Sole |
| 2010/0075673 | A1* | 3/2010 | Colbert et al. ............. 455/435.1 |
| 2010/0077038 | A1 | 3/2010 | Boberg et al. |
| 2010/0088388 | A1* | 4/2010 | Donovan ...................... 709/207 |

FOREIGN PATENT DOCUMENTS

| | | |
|---|---|---|
| EP | 1396987 A2 | 3/2004 |
| EP | 1511267 A1 | 3/2005 |
| EP | 1545146 A2 | 6/2005 |
| EP | 1775907 A2 | 4/2007 |
| EP | 1793561 A1 | 6/2007 |
| EP | 1396975 A3 | 1/2009 |
| WO | 2005096592 A1 | 10/2005 |
| WO | 2007007170 A2 | 1/2007 |
| WO | 2008016263 A1 | 2/2008 |

OTHER PUBLICATIONS

Office Action dated Dec. 22, 2011, 30 pages, U.S. Appl. No. 12/621,256, filed Nov. 18, 2009.

McColgan, Brian, et al.; U.S. Appl. No. 12/333,710; filed Dec. 12, 2008; Title: Method and System for a Context Aware Mechanism for Use in Presence and Location.

McColgan, Brian, et al.; U.S. Appl. No. 12/333,756; filed Dec. 12, 2008; Title: Method and System for a Context Aware Mechanism in an Integrated or Distributed Configuration.

McColgan, Brian, et al.; U.S. Appl. No. 12/333,784; filed Dec. 12, 2008; Title: Method and System for Specifying, Applying and Extending Application Related Aspects Through Policies, Rules and/or Triggers.

McColgan, Brian et al.; U.S. Appl. No. 12/251,231; filed Oct. 4, 2008; Title: Method for Managing Opaque Presence Indications within a Presence Access Layer.

Rossi, Randy, et al.; U.S. Appl. No. 12/252,574; filed Oct. 16, 2008; Title: System for Assignment of a Service Identifier as a Mechanism for Establishing a Seamless Profile in a Contextually Aware Presence Access Layer.

Rogers, Jeff, et al.; U.S. Appl. No. 12/252,207; filed Oct. 15, 2008; Title: Interworking Function with a Presence Access Layer to Provide Enhanced Presence Aspect Indications.

Lee, Dalsu, et al.; U.S. Appl. No. 12/252,211; filed Oct. 15, 2008; Title: Incorporating Non-Presence Information in the Calculation of Presence Aspects by a Presence Access Layer.

Rogers, Jeff, et al.; U.S. Appl. No. 12/252,221; filed Oct. 15, 2008; Title: Use of Persistent Sessions by a Presence Access Layer.

So, Sin-Hang, et al.; U.S. Appl. No. 12/253,102; filed Oct. 16, 2008; Title: Controlling and/or Limiting Publication Through the Presence Access Layer.

Bells, Matther, et al.; U.S. Appl. No. 12/621,256; filed Nov. 18, 2009; Title: Apparatus, and an Associated Method, for Providing and Using Opaque Presence Indications in a Presence Service.

3GPP TS 23.141 V8.0.0; 3rd Generation Partnership Project; Technical Specification Group Services and System Aspects; Presence Service; Architecture and functional description; Release 8; Mar. 2008; 36 pgs.

Brok, Jacco, et al.; Title: Enabling New Services by Exploiting Presence and Context Information in IMS; Bell Labs Technical Journal 10(4); 2006; pp. 83-100.

Chatterjee, Samir, et al.; Title: Instant Messaging and Presence Technologies for College Campuses; IEEE Network; May/Jun. 2005; pp. 4-13.

Cisco Systems, Inc.; Cisco BTS 10200 Softswitch Release 4.1, 4.2, 4.4, 4.5, and 4.5.1 Provisioning Guide; Chapter 8; Nov. 17, 2008; 48 pgs.

Roach, A. B.; et al.; "A Session Initiation Protocol (SIP) Event Notification Extension for Resource Lists;" Network Working Group; RFC 4662; Aug. 2006; 40 pgs.

Olson, S., et al.; SIMPLE Presence Publication Mechanism (draft-olson-simple-publish-01); Oct. 24, 2002; 27 pgs.

Open Mobile Alliance, LTD.; PAL Explained; OMA-PAG-2008-0608R01-INP_PAL_V1_0_Overview; Sep. 16, 2008; 16 pgs.

Open Mobile Alliance, LTD.; Presence SIMPLE Specification; Draft Version 2.0—Jul. 2, 2008; OMA-TS-Presence_SIMPLE-V2_0-20080702-D; 90 pgs.

Open Mobile Alliance, LTD; Presence Access Layer WID; OMA-TP-2008-0105R03-INP_PAL_WI_for_presentation; Jun. 25, 2008; 22 pgs.

Khartabil, H., et al., "Functional Description of Event Notification Filtering," Network Working Group, RFC 4660, Sep. 2006, 35 pgs.

Rosenberg, J., et al.; Title: Session Initiation Protocol (SIP) Extensions for Presence; Internet Engineering Task Force; Internet Draft: draft-ietf-simple-presence-07.txt; May 20, 2002; 27 pgs.

PCT International Search Report; PCT Application No. PCT/CA2009/000251; Jul. 6, 2009; 5 pgs.

PCT International Preliminary Report on Patentability; PCT Application No. PCT/CA2009/000251; Jan. 24, 2011; 15 pgs.

PCT Written Opinion of the International Searching Authority; PCT Application No. PCT/CA2009/000251; Jul. 6, 2009; 6 pgs.

PCT International Search Report; PCT Application No. PCT/US2009/033806; May 14, 2009; 4 pgs.

PCT Written Opinion of the International Searching Authority; PCT Application No. PCT/US2009/033806; May 14, 2009; 6 pgs.

PCT International Preliminary Report on Patentability; PCT Application No. PCT/US2009/033806; Jan. 19, 2011; 11 pgs.

PCT Communication Relating to the Results of the Partial International Search; PCT Application No. PCT/US2009/033808; Dec. 7, 2009; 6 pgs.
PCT International Search Report; PCT Application No. PCT/US2009/033808; Mar. 12, 2010; 7 pgs.
PCT Written Opinion of the International Searching Authority; PCT Application No. PCT/US2009/033808; Mar. 12, 2010; 6 pgs.
PCT International Search Report; PCT Application No. PCT/US2009/033809; Dec. 1, 2009; 4 pgs.
PCT Written Opinion of the International Searching Authority; PCT Application No. PCT/US2009/033809; Dec. 1, 2009; 5 pgs.
PCT International Search Report; PCT Application No. PCT/CA2009/000356; Jul. 16, 2009; 4 pgs.
PCT Written Opinion of the International Searching Authority; PCT Application No. PCT/CA2009/000356; Jul. 16, 2009; 3 pgs.
PCT International Preliminary Report on Patentability; PCT Application No. PCT/CA2009/000356; Jan. 20, 2011; 11 pgs.
PCT International Search Report; PCT Application No. PCT/CA2009/000355; Jul. 7, 2009; 3 pgs.
PCT Written Opinion of the International Searching Authority; PCT Application No. PCT/CA2009/000355; Jul. 7, 2009; 4 pgs.
PCT Written Opinion of the International Preliminary Examining Authority; PCT Application No. PCT/CA2009/000355; Oct. 18, 2010; 5 pgs.
PCT International Search Report; PCT Application No. PCT/CA2009/001647; Feb. 23, 2010; 3 pgs.
PCT Written Opinion of the International Searching Authority; PCT Application No. PCT/CA2009/001647; Feb. 23, 2010; 5 pgs.
PCT International Preliminary Report on Patentability; PCT Application No. PCT/CA2009/001647; Feb. 22, 2011; 10 pgs.
Office Action dated Jul. 23, 2010, 20 pages, U.S. Appl. No. 12/252,574, filed Oct. 16, 2008.
Office Action dated Nov. 29, 2010, 5 pages, U.S. Appl. No. 12/252,574, filed Oct. 16, 2008.
Examiner's Answer dated May 17, 2011, 7 pages, U.S. Appl. No. 12/252,574, filed Oct. 16, 2008.
Office Action dated Mar. 22, 2011, 30 pages, U.S. Appl. No. 12/252,207, filed Oct. 15, 2008.
Office Action dated Mar. 23, 2011, 30 pages, U.S. Appl. No. 12/252,211, filed Oct. 15, 2008.
Office Action dated Dec. 6, 2010, 23 pages, U.S. Appl. No. 12/252,221, filed Oct. 15, 2008.
Final Office Action dated Apr. 14, 2011, 14 pages, U.S. Appl. No. 12/252,221, filed Oct. 15, 2008.
Notice of Allowance dated Sep. 22, 2011, 23 pages, U.S. Appl. No. 12/252,221, filed Oct. 15, 2008.
Office Action dated Feb. 17, 2011, 25 pages, U.S. Appl. No. 12/253,102, filed Oct. 16, 2008.
Day, M., et al.; "A Model for Presence and Instant Messaging"; RFC 2778; Feb. 2000; 16 pages.
Office Action dated Feb. 13, 2012; U.S. Appl. No. 12/251,231 filed Oct. 14, 2008; 35 pages.
Office Action dated Aug. 3, 2012; U.S. Appl. No. 12/251,231 filed Oct. 14, 2008; 19 pages.
Notice of Allowance dated Oct. 4, 2012, 20 pages, U.S. Appl. No. 12/621,256, filed Nov. 18, 2009.

* cited by examiner

USE OF PERSISTENT SESSIONS BY A PRESENCE ACCESS LAYER

CROSS-REFERENCE TO RELATED APPLICATIONS

This application is a continuation which claims benefit of and priority to U.S. patent application Ser. No. 12/252,221 filed Oct. 15, 2008, now U.S. Pat. No. 8,103,730 issued on Jan. 24, 2012, by Jeff Rogers, et al, entitled "Use of Persistent Sessions by a Presence Access Layer," which is incorporated by reference herein as if reproduced in its entirety.

BACKGROUND

Some user agents (UAs), such as mobile telecommunications devices, can collect presence information associated with the users of the user agents. The presence information might include the user's location, the user's availability, the user's willingness to communicate, the user's willingness to use a particular service or communication method, the user's state of mind, activities the user is currently engaged in, applications currently executing on the user's UA, and similar data that relates to the current state of the user and/or the UA. An entity that has presence information associated with it, such as a human user of a UA, can be referred to as a presentity. A presentity might also be a non-human entity, such as an application executing on a UA. An entity that provides presence information on behalf of one or more presentities can be referred to as a presence source. For example, a UA that provides presence information associated with its user could be a presence source. When a presence source is associated with only one presentity, the presence source and the presentity could be considered equivalent.

A presence source that has collected presence information about a presentity might transmit the presence information to an entity that can be referred to as a presence server. The presence server might then provide the presence information to an entity that wishes to consume the presence information. This entity can be referred to as a watcher. As an example, if a presentity "Bob" has consented to allow other users to have access to information about his current location, Bob's UA might transmit his location information to a presence server. If a watcher "Alice" wished to learn Bob's current location, Alice's UA might submit an appropriate request to the presence server, and the presence server might send presence information about Bob to Alice's UA. Alice's UA might then process the presence information to determine Bob's location.

As used herein, the term "user agent" or "UA" might in some cases refer to a mobile device such as a mobile telephone, a personal digital assistant, a handheld or laptop computer, or a similar device that has telecommunications capabilities. In other cases, the term "UA" might refer to devices that have similar capabilities but that are not transportable, such as fixed line telephones, desktop computers, set-top boxes, or network nodes. The term "UA" can also refer to any hardware or software component that can terminate a communication session, such as a Session Initiation Protocol (SIP) session. Also, the terms "user agent", "UA", "user equipment", "UE", and "node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure discusses the use of persistent sessions in the collection and dissemination of presence-related information. The presence-related information might be provided to and processed by a presence access layer, which, as described in more detail below, is an entity that can assume some of the functions that might otherwise be performed by presence-enabled services or applications. The following discussion of presence information in general and the presence access layer in particular may aid in clarifying the subsequent discussion of persistent sessions.

Figure 1:
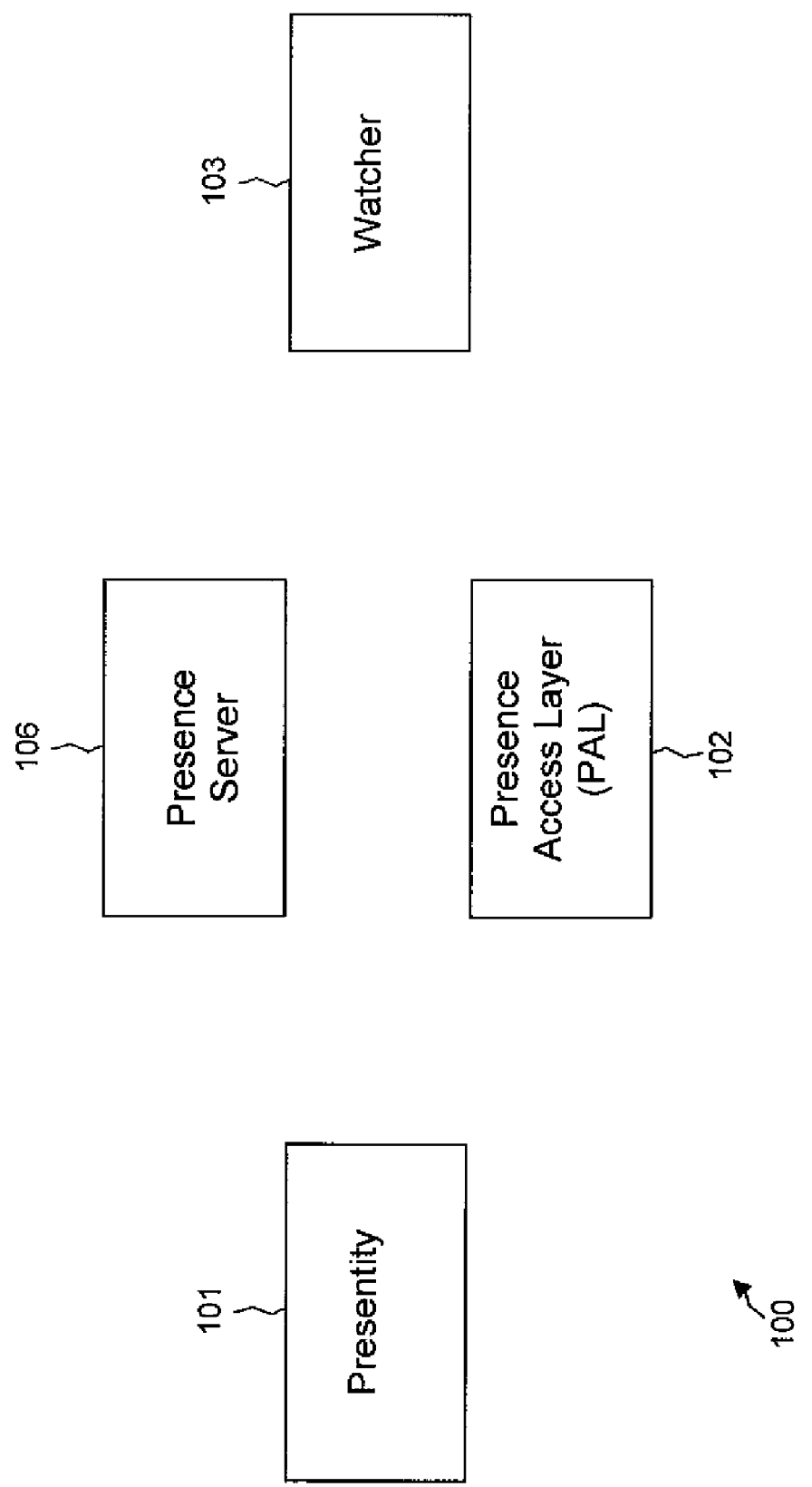
FIG. 1 is a block diagram of a communications system according to an embodiment of the disclosure.

FIG. 1 is a block diagram of an embodiment of a system 100 that includes one or more presentities 101, one or more watchers 103, one or more presence servers 106, and a presence access layer (PAL) 102, as described below. The PAL 102 might reside wholly or partially in the presence server 106, in the presentity 101, in the watcher 103, in one or more services or applications, and/or in one or more other network components. The functionality provided by the PAL 102 may be divided between these and/or other components. Alternatively, the PAL 102 might be a standalone component.

As mentioned above, the presentity 101 might be a human or non-human entity with which presence information is associated. The presentity 101 might reside wholly or partially on a UA or wholly or partially in a network or on a network component. Although not shown, multiple presence sources that capture presence information on behalf of the presentity 101 might be present. Multiple presentities 101 might also be present, and a single presence source might be associated with multiple presentities 101 and/or a single presentity 101 might be associated with multiple presence sources. Hereinafter, the term "presentity" might refer only to one or more presentities 101 or might refer to one or more presentities 101 and one or more associated presence sources. That is, no distinction will be made between a presentity and a presence source, but it should be understood that in some cases these can be separate entities.

The watcher 103 might be one or more humans, applications, services, or other entities that monitor or wish to consume presence information associated with the presentity 101. When the watcher 103 is an application or a service, the application or service might be wholly or partially resident on a UA. Alternatively, the application or service might be wholly or partially resident on a network component. Hereinafter, the term "watcher" might refer to a human, an application, or a service interested in presence information, to a UA or network component on which such an application or service resides, or to any combination of these entities.

The presentity 101 might be able to define which watchers 103 can receive the presentity's presence information and which presence information the watchers 103 can receive. As an example, the presentity user "Bob" might specify that all of his work supervisors can receive all of his presence information. He might also specify that the watcher "Alice" can receive information about his current willingness to communicate but can receive none of his other presence information, such as his current location. Alternatively, another entity, such as Bob's employer, might designate which elements of Bob's presence information will be made available to which watchers 103.

A plurality of applications or services, such as instant messaging services or push-to-talk services, might be associated with the presentity 101, and these applications or services might be provided by one or more devices. The presentity 101 might publish presence information from a plurality of these devices. For example, Bob might be using a desktop computer and a handheld telephone simultaneously and may be considered available on either device. If Bob did not use the computer for an extended period of time, the computer might enter a sleep mode, and Bob might become unavailable on that device. However, he might remain available on the handset.

The presentity 101 can publish its presence information to the presence server 106. Only certain portions of the presence information might be made available to the watchers 103, and only certain watchers 103 might have access to the presence information. The presentity 101 or a third party (for example, a service provider or administrator) might publish rules or policies to the presence server 106 that define the portions of the presence information that will be made available to the watchers 103 and which of the portions will be made available to which of the watchers 103. The rules or polices might be established for groups of presentities 101 and/or groups of watchers 103. The rules or polices might be provided to the presence server 106 in a policy document. Alternatively, the presence information that will be made available to a particular watcher 103 might be determined at the time that watcher 103 requests presence information.

As used herein, the term "rule" refers to a sequence of logic that, when executed, can specify actions. The term "policy" refers to logic that can aid in the evaluation of a rule by, for example, providing hints, clarifying indeterminate or inconclusive scenarios during processing, or providing parameters. A distinction might also be made between a rule and a base rule and between a policy and a base policy. A base rule is typically a common interoperable rule or a default rule. That is, a base rule is a rule that is specified when no specific service or platform has overridden or changed it. Therefore, the term "rule" could refer to any rule, base or otherwise. Similarly, the term "policy" could refer to the set of all policies, and the term "base policy" could refer to a common or default policy that is used when a policy has not been overridden, extended, or enhanced.

The presence server 106 is a network component that receives presence information from the presentity 101 and provides presence information to the watcher 103. The rules or policies that define the presence information that will be made available to the watchers 103 might be stored on and/or processed by the presence server 106. When the watcher 103 wishes to receive presence information associated with the presentity 101, the watcher 103 can send a request to the presence server 106. The presence server 106 can then determine if the watcher 103 is authorized to receive the presentity's presence information. If the watcher 103 is authorized, the presence server 106 sends the presence information to the watcher 103.

The presence information might be sent to the watcher 103 in a Presence Information Data Format (PIDF). Alternatively, more detailed information might be provided if the rich presence extension to PIDF (RPID) is used. In either case, the presence information might be provided in a presence document that can be encoded in extensible markup language (XML) or another appropriate format. The presence document is typically a large document that contains all of the presence information that the presentity 101 has allowed the watcher 103 to obtain. That is, even when the watcher 103 wants to learn only a single element of presence information, such as the presentity's current willingness to communicate, the presence document might contain numerous additional elements of presence information.

Upon receiving the presence document, the watcher 103 parses the XML or other encoding scheme to extract the desired presence information. The entire presence document is typically parsed, regardless of the amount of presence information that is sought. For example, if the watcher 103 wished to learn the presentity's current willingness to communicate, the watcher 103 might need to sift through large amounts of unrelated data, such as the presentity's location, the presentity's willingness to use a particular service, the applications currently executing on the presentity's UA, and other information, to find the single data element that is desired.

In some cases, the watcher 103 might wish to learn a combination of information about the presentity 101. For example, if the watcher 103 wanted to send an instant message to the presentity 101, the watcher 103 might first attempt to determine the presentity's willingness to communicate and whether an instant messaging application is currently executing on the presentity's UA. In such cases, the watcher 103 might again send a single request for presence information to the presence server 106 and might again receive the entire presence document. The watcher 103 would then parse the entire document to find the plurality of data elements that are desired and perform the appropriate logical operations to correlate the data elements and derive the combination of information that was desired.

It may be possible that the presentity 101 did not specify whether or not the watcher 103 could have access to a data element that the watcher 103 is trying to obtain. In that case, the presence document may not contain the information that the watcher 103 is seeking. In such a case, the results of the watcher's parsing of the presence document may be indeterminate and it may not be clear what further actions the watcher 103 should take.

In some cases, the PAL 102 might be present to promote more efficient processing and dissemination of presence information. The PAL 102 can abstract and simplify complex presence information on behalf of the watcher 103. That is, the PAL 102 can act as a proxy for the watcher 103 by receiving a presence information request from the watcher 103, sending the request to the presence server 106, receiving a presence document from the presence server 106, parsing the information in the presence document, and returning to the watcher 103 a single value, such as "true" or "false", as a response to the presence information request.

The PAL 102 allows the watcher 103 to submit a request for a single element of presence information, which can be referred to as a presence aspect. For example, the presentity's willingness to communicate might be a presence aspect, the presentity's current location might be another, the presentity's preferred means of communication might be another, and so on. The presence aspects are reusable, interoperable abstractions that can be applicable across a plurality of applications or services. The watcher 103 can send a message to the PAL 102 specifying a single presence aspect for which the watcher 103 is seeking information. The PAL 102 can then respond with information related only to that presence aspect.

As an example, if the watcher 103 wishes to learn whether the presentity 101 is currently willing to communicate, the watcher 103 can submit a request to the PAL 102 for information specifically about that presence aspect. If the presentity 101 has specified that the watcher 103 can have access to the presentity's willingness information, the PAL 102 can respond with a single value indicating the presentity's willingness or unwillingness to communicate. The watcher 103 then needs to process only this single value. This can be contrasted with the situation where the PAL 102 is not present. In that case, the watcher 103 would ask for presence information in general, receive the entire presence document, and parse the presence document to determine the willingness aspect.

The PAL 102 can also process more complex requests from the watcher 103. For example, if the watcher 103 wished to determine a combination of information associated with the presentity 101, the watcher 103 might send the PAL 102 a request for each desired presence aspect. The PAL 102 might then return a response for each of the requests. Alternatively, the PAL 102 might correlate multiple presence aspects and return a single value to the watcher 103 that represents the combination of information that the watcher 103 was seeking.

In addition to greatly simplifying the manner in which the watcher 103 requests, receives, and processes presence information, use of the PAL 102 can allow processing that might previously have been performed by the watcher 103 to be offloaded to the PAL 102. In the cases where the PAL 102 is a standalone component or resides wholly or partially in the presence server 106 or some other network component, offloading the processing of presence information to the PAL 102 can free some of the processing capabilities of the watcher 103 for other purposes.

The PAL 102 may also process presence information on behalf of multiple applications or services that might otherwise redundantly perform the same presence information processing. That is, multiple applications or services might reside on or be available to the watcher 103, and each might have the capability to request, receive, and process presence information. Many of the steps that the applications or services take with regard to the presence information might be common to several of the applications or services. For example, there may be common presence-related rules or logic that would apply to both an instant messaging service and a push-to-talk service. If the PAL 102 is not present, each of these services might perform the common steps separately. If the PAL 102 is present, the PAL 102 can perform the common steps on behalf of each of these services and then return the results of the processing to the services. This can allow common procedures to occur only one time, thus increasing the efficiency of the watcher 103 and the applications or services it uses.

The PAL 102 can also ensure that indeterminate results are not returned to the watcher 103. As mentioned previously, if the watcher 103 seeks information about a presence aspect for which the presentity 101 has not provided information, the watcher's parsing of the presence document to determine that information might be inconclusive. The PAL 102, however, can contain functionality that specifies a definitive response to a presence information request even when information about the requested presence aspect is not available. For example, if the presentity 101 has not specified a willingness or an unwillingness to communicate, and if the watcher 103 submits a request for the presentity's willingness presence aspect, the PAL 102 might provide a default willingness value to the watcher 103. For instance, the PAL 102 might indicate that the presentity 101 is unwilling to communicate for an indefinite period of time. In this way, the watcher 103 can be assured of receiving a usable response to any presence information request.

While the above discussion has focused on the PAL 102 providing presence information to the watcher 103 in response to the watcher's request for the current status of that information, the PAL 102 might also provide presence information based on a trigger defined by the watcher 103. That is, the watcher 103 might specify that it wishes to be informed when a change occurs in a presence aspect. When the PAL 102 detects that the specified change has occurred, the PAL 102 can notify the watcher 103 of the change. A trigger might apply to a presence aspect alone or to a presence aspect in combination with one or more applications or services. In addition, a trigger might be used to receive presence information from a plurality of presentities 101 and/or to provide presence information to a plurality of watchers 103.

As an example, the watcher 103 might have previously determined that the presentity's willingness presence aspect has a value that indicates that the presentity 101 is currently unwilling to communicate. The watcher 103 might wish to know if the presentity 101 becomes willing to communicate at a later point in time. The watcher 103 could establish a trigger on the PAL 102 requesting to be notified of a change in the presentity's willingness presence aspect. The PAL 102 would then monitor the presentity's willingness presence aspect and would inform the watcher 103 if that presence aspect changed from "unwilling" to "willing".

The use of the PAL 102 does not necessarily preclude the presence server 106 sending the presence document to the watcher 103. For example, if the watcher 103 wishes to obtain a large amount of presence information, there may be circumstances in which it is more efficient for the watcher 103 to parse the entire presence document received from the presence server 106 rather than processing multiple individual presence aspect values received from the PAL 102. The PAL 102 provides an upgrade option that might be used to hide complexity from the watcher 103 in some circumstances.

The above discussion was intended to provide sufficient information to promote an understanding of presence information in general and the presence access layer in particular. With this context in place, the discussion can now turn to the use of persistent sessions in the collection and dissemination of presence-related information.

Figure 2:
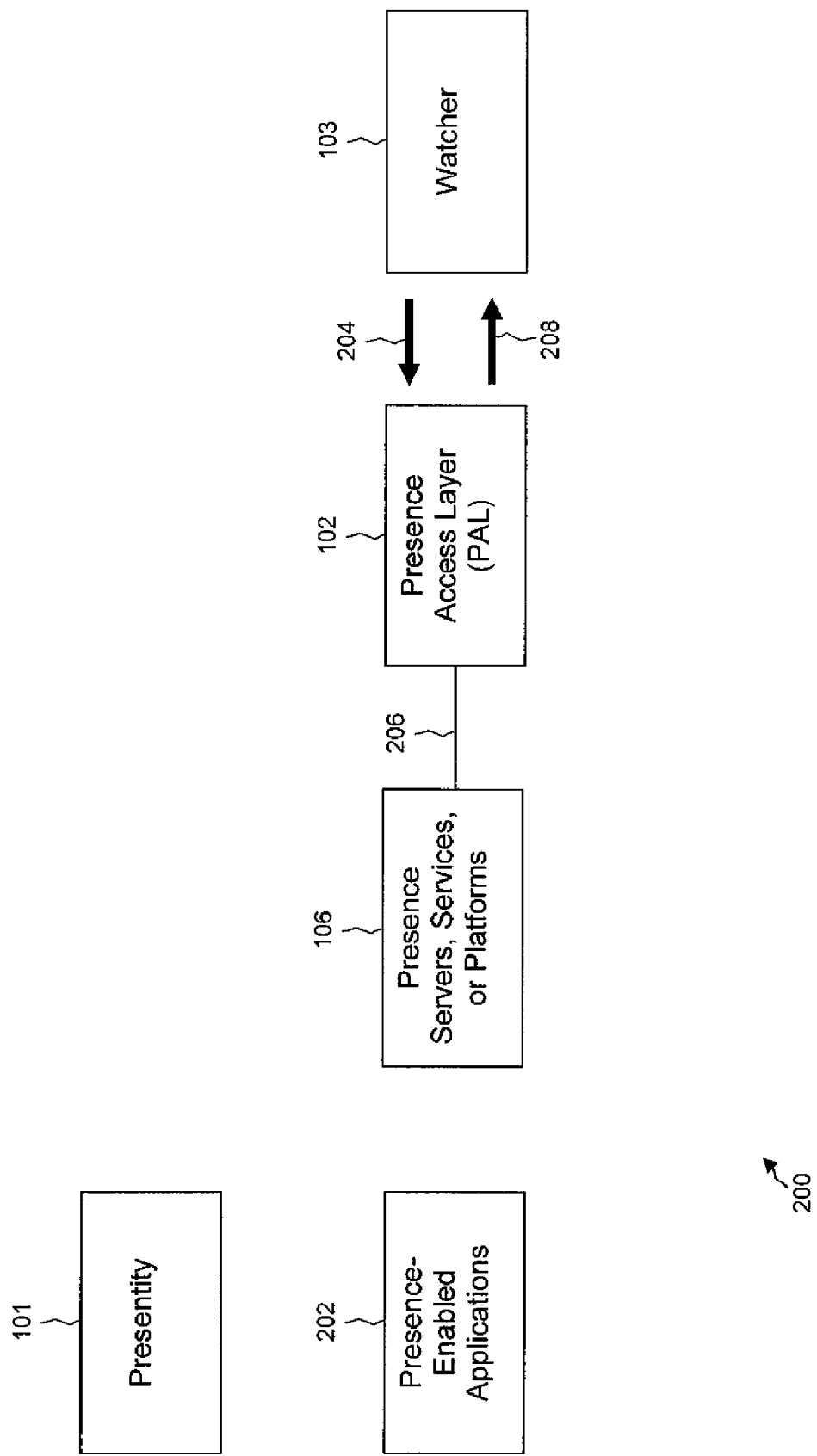
FIG. 2 is a block diagram of a communications system according to an alternative embodiment of the disclosure.

FIG. 2 illustrates a system 200 that might implement the PAL 102. The presentity 101 and the watcher 103 as described in regard to FIG. 1 might be present. One or more presence-enabled applications 202 might also be present and might be accessible to the presentity 101. The applications 202 might be, for example, instant messaging applications, push-to-talk applications, location-based services, or other applications that can use and/or generate presence information associated with the presentity 101 or with a presence user agent acting on behalf of the presentity 101. The applications 202 might collect the presentity's presence information and provide the presence information to one or more presence servers 106, presence services, or presence platforms. The PAL 102 is capable of requesting the presence information from the presence server 106 on behalf of the watcher 103.

In an embodiment, the watcher 103 can send the PAL 102 a subscription message 204 or a similar message requesting presence information associated with the presentity 101. In particular, the subscription message 204 might be a Session Initiation Protocol (SIP) SUBSCRIBE message. The subscription message 204 can promote the establishment of a persistent session 206, as described below, between the PAL 102 and the presence server 106. That is, the PAL 102 remains connected to the presence server 106 and can continue to consume and process presence information via the persistent session 206 even when the watcher 103 disconnects from the PAL 102 or moves out of wireless communication coverage. The PAL 102 can evaluate, aggregate, prune, or otherwise manage the presence information and perhaps create and store a report based on the information. When the watcher 103 reconnects to the PAL 102, the PAL 102 can send the stored presence information to the watcher 103 via a non-persistent path 208. In an alternative embodiment, the reports or aggregated presence information may be sent to an interested observer other than the watcher 103 (for example, a suitably authorized administrative principal).

The persistent session 206 may be one of two types. In one type of persistent session 206, which can be referred to as a "sticky session", the watcher 103 can specify a length of time that the persistent session 206 between the PAL 102 and the presence server 106 will remain in effect. Such a specification by the watcher 103 is known as a "sticky subscription". For example, the watcher 103 might specify that, after the watcher 103 disconnects from the PAL 102, the PAL 102 should continue to collect presence information from the presence server 106 for a period of several hours, several days, several weeks, or any other suitable length of time. In the other type of persistent session 206, which can be referred to as a "non-expiring session", the session between the PAL 102 and the presence server 106 lasts indefinitely and does not expire.

These two types of the persistent session 206 can be contrasted with previous situations, where a watcher might send a SIP SUBSCRIBE message directly to a presence server. Under SIP standards, a session initiated by such a SIP SUBSCRIBE message would typically expire after one hour. If the watcher wished to continue to receive presence information after the expiration of the hour, the watcher might need to send another SIP SUBSCRIBE message to initiate a new session. With the persistent session 206 between the PAL 102 and the presence server 106, on the other hand, a single SIP SUBSCRIBE message from the watcher 103 can cause the PAL 102 to continue to receive presence information for more than one hour.

As used herein, the term "persistent session" will refer to any communication session that is longer than the standard, default, or usual duration of such a session. That is, the persistent session 206, regardless of whether it is a sticky session or a non-expiring session, extends beyond the typical duration of the underlying or base communication session, such as the duration prompted by the SIP SUBSCRIBE message in the above example.

In an embodiment, the PAL 102 could automatically send the stored presence information to the watcher 103 at approximately the time the watcher 103 reconnects to the PAL 102. Alternatively, after reconnecting to the PAL 102, the watcher 103 can retrieve the stored presence information from the PAL 102 by sending the PAL 102 an appropriate request message. The PAL 102 might then transmit the presence information to the watcher 103 at approximately that time. Alternatively, the watcher 103 might arrange to have the presence information transferred from the PAL 102 at periodic intervals. For example, the watcher 103 might send the PAL 102 a message requesting that the PAL 102 transmit the presence information every hour, every several hours, once a day, or at some other suitable interval.

Several examples might demonstrate the use of persistent sessions in conjunction with the PAL 102. In one example, the watcher 103 might be a supervisor of the presentity 101. The watcher 103 might wish to be aware of the presentity's availability for communication over an extended period of time and might send the PAL 102 a single request 204 for the presentity's availability information throughout that time period. The watcher 103 might then disconnect from the PAL 102. For example, the supervisor might 'log out' for the day. The PAL 102 could maintain a subscription to the presentity's availability information with the presence server 106 for the period of time specified by the watcher 103. During that time, the presentity 101 might use a presence-enabled application 202 to, for example, indicate a completed work item within an overall project schedule. The application 202 could provide the presence server 106 with presence information in the form of an indicator of the completed work item. The presence server 106 could then provide the information to the PAL 102 via the persistent session 206. The PAL 102 could then evaluate and/or store the information relating to the newly completed work item. When the watcher 103 reconnects to the PAL 102, the PAL 102 could automatically send the watcher 103 the information, the watcher 103 could request the information, or the PAL 102 could send the watcher 103 the information after a pre-specified interval.

In another example, the watcher 103 might be a law enforcement agency or other government entity that is interested in collecting presence information associated with a suspicious presentity 101. The watcher 103 might wish to learn the presentity's location, persons the presentity 101 has communicated with, applications 202 that the presentity 101 has used, and other presence information that the presentity 101 might generate over an extended period of time. The watcher 103 might send the PAL 102 a request 204 for this information and then disconnect from the PAL 102. The PAL 102, following lawful interception procedures, might collect this information over a specified period of time via the persistent session 206. The PAL 102 could also evaluate and store the presence information and perhaps generate a report showing the presentity's activities over the specified time period based on rules and/or policy. The PAL 102 could then send the watcher 103 the presence information after the watcher 103 reconnects to the PAL 102.

In another example, the watcher 103 might be a parent who wishes to keep track of his teenage son's activities. The teenage son might be a presentity 101 who makes use of a plurality of applications 202 that can collect presence information associated with the presentity 101. The watcher 103 might send the PAL 102 a message 204 requesting that all available presence information associated with the presentities 101 be collected over a specified time period. That is, the watcher 103 might send a "sticky subscription" to the PAL 102. One or more presence servers 106 might collect the presence information from the applications 202 and, based on the "sticky subscription", send the corresponding information to the PAL 102 via the persistent session 206.

The PAL 102 might receive other instructions regarding how the information is to be processed. For example, the instructions might specify that some portions of the information should be flagged as more relevant than other portions, that some portions can be aggregated with others, that some portions can be deleted, and that when such processing of the information is complete, a report in a specified format should be created. The PAL 102 can follow the instructions to create the report from the presence information, and the watcher 103 might retrieve the report after reconnecting to the PAL 102.

Additionally, the watcher 103 may specify criteria under which the sticky subscription is to be maintained. For example, the parent (as the watcher 103) monitoring the teenage son (as the presentity 101) might establish that the persistent session should proceed until the teenage son returns home. For instance, a location-based service on the son's UA might detect when the son is in a "home" location. The criteria might be associated by the PAL 102 through rules and/or policy, while the action to terminate the sticky subscription might be achieved via a PAL trigger.

Figure 3:
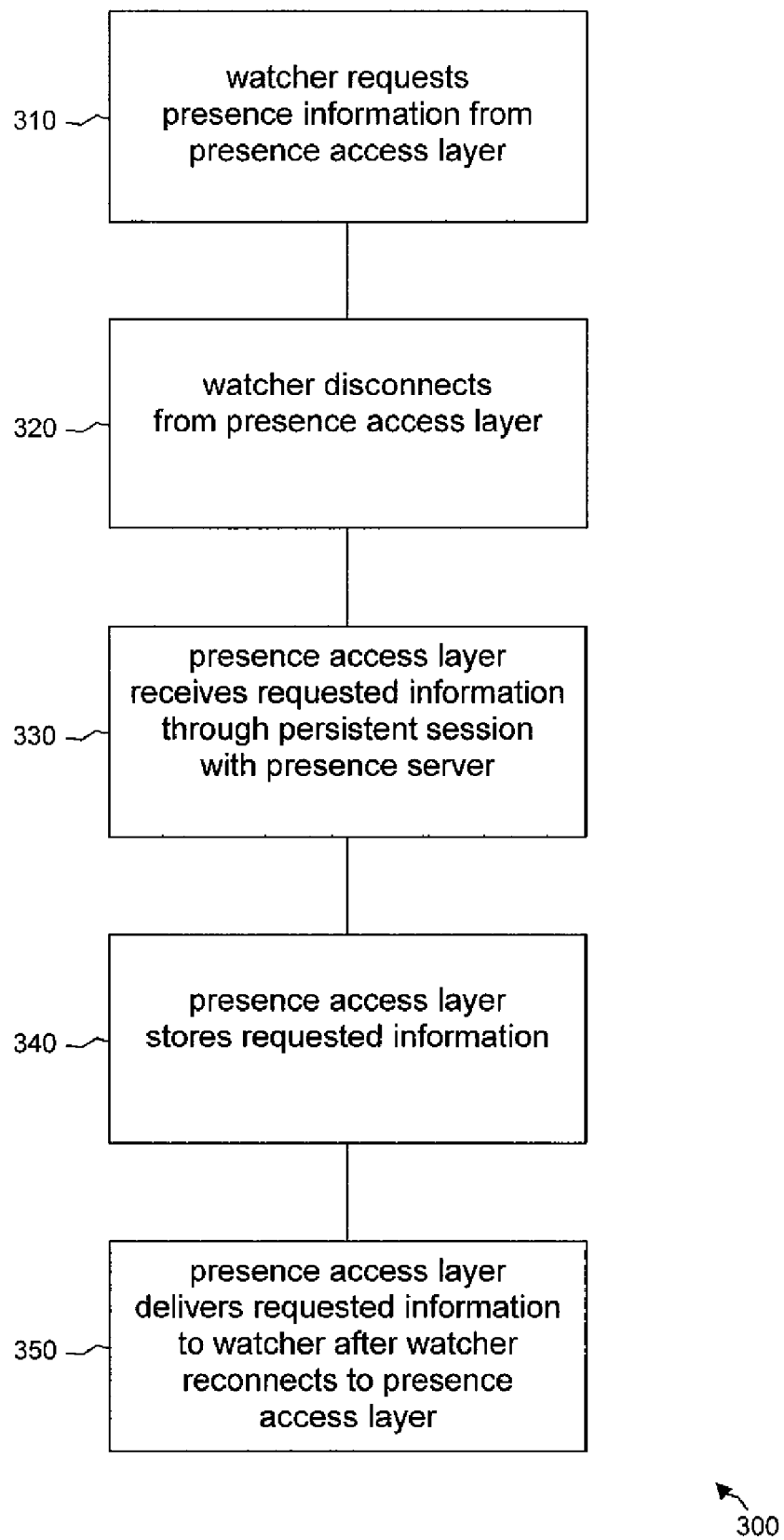
FIG. 3 is a flow chart of a method for a watcher to receive presence information according to an embodiment of the disclosure.

FIG. 3 illustrates a method 300 for a watcher to receive presence information. At block 310, a watcher requests presence information from a presence access layer. At block 320, the watcher disconnects from the presence access layer. The disconnection may be voluntary on the part of the watcher or might occur without the watcher's knowledge, such as when the watcher moves out of wireless communication coverage. At block 330, the presence access layer, which has remained connected to a presence server via a persistent session, receives the requested information through the persistent session. At block 340, the presence access layer stores the requested information. The presence access layer might reformat or otherwise process the stored information. For example, the presence access layer might create a report based on the stored information. At block 350, the presence access layer delivers the requested information to the watcher after the watcher reconnects to the presence access layer.

The use of persistent sessions as described herein can optimize network traffic during session establishment by reducing or eliminating the number of additional subscription messages a watcher sends to a presence server. The watcher can request presence information by sending only a single subscription message to a presence access layer. The presence access layer can continue to collect the presence information even if the session between the presence access layer and the watcher expires and can deliver the presence information to the watcher at a later time. This reduces the overhead that might otherwise be consumed if the watcher established a new session with a new subscription message each time the previous subscription expired.

Figure 4:
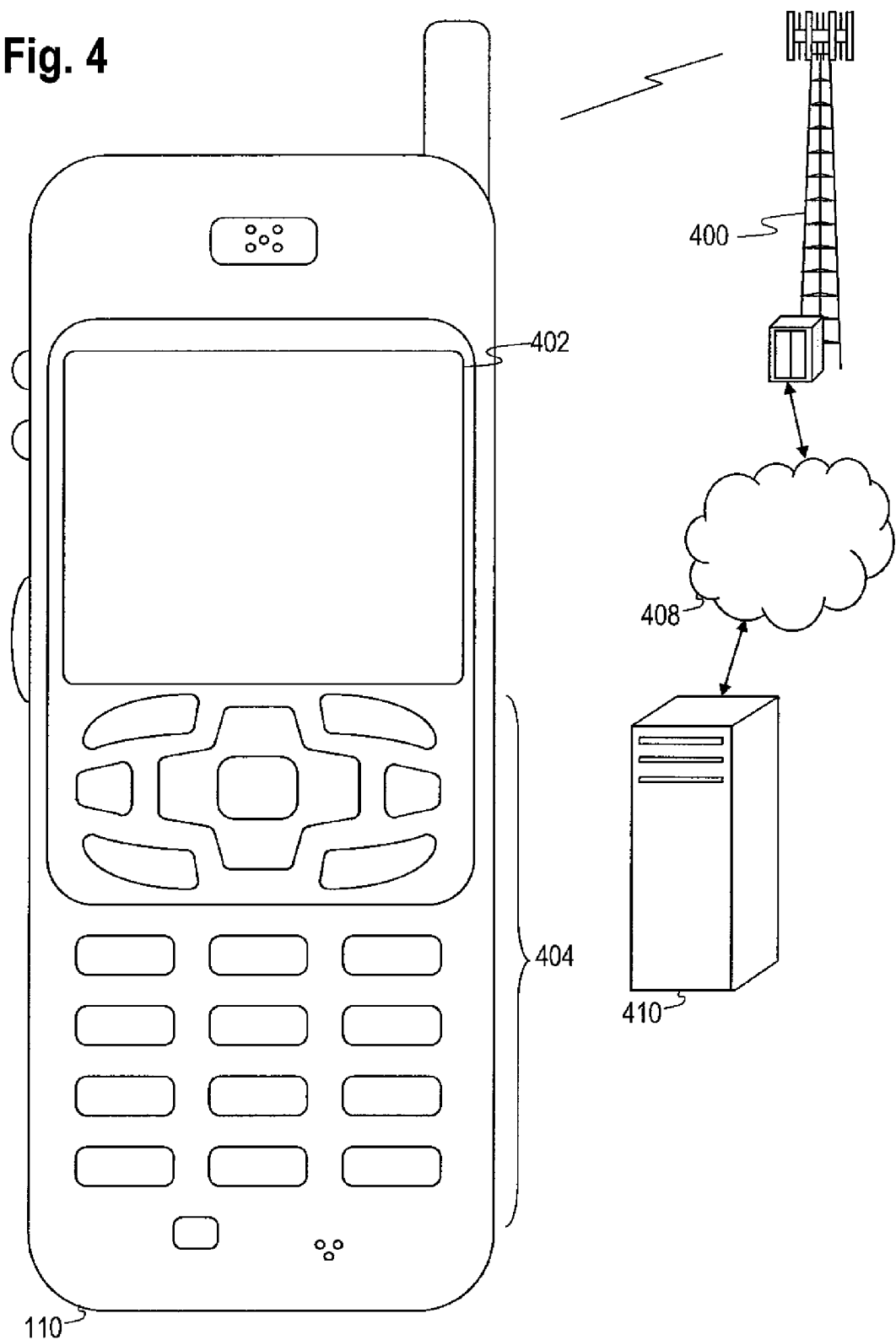
FIG. 4 is a diagram of a wireless communications system including a user agent operable for some of the various embodiments of the disclosure.

FIG. 4 illustrates a wireless communications system including an embodiment of a UA 110 that might be used by the presentity 101 and/or the watcher 103. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, wireless handset, pager, or PDA. In another embodiment, the UA 110 may be a portable, laptop or other computing device. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct. The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

Figure 5:
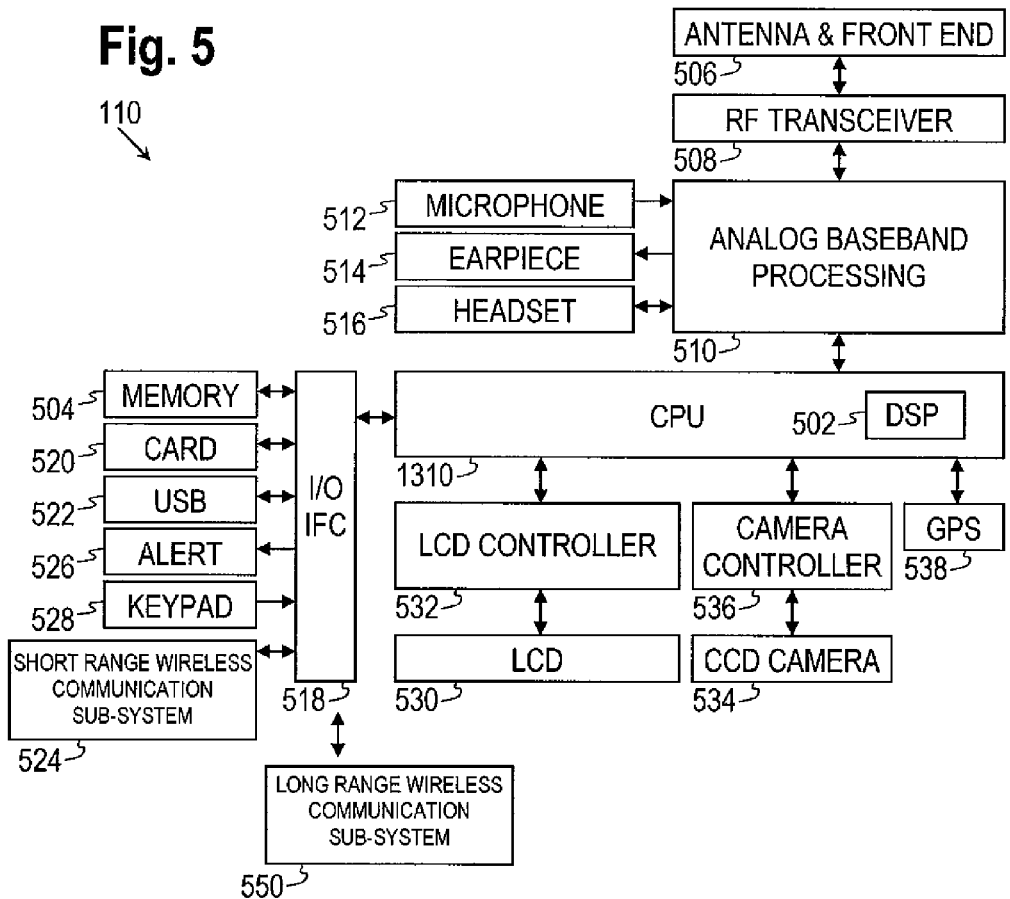
FIG. 5 is a block diagram of a user agent operable for some of the various embodiments of the disclosure.

FIG. 5 shows a block diagram of the UA 110. While a variety of known components of UAs 110 are depicted, in an embodiment a subset of the listed components and/or additional components not listed may be included in the UA 110. The UA 110 includes a memory 504 and a central processing unit (CPU) 1310 that may incorporate a digital signal processor (DSP) 502. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby UAs and/or wireless base stations. A long range wireless communication sub-system 550 may also be present and may be compliant with IEEE 802.16.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

Figure 6:
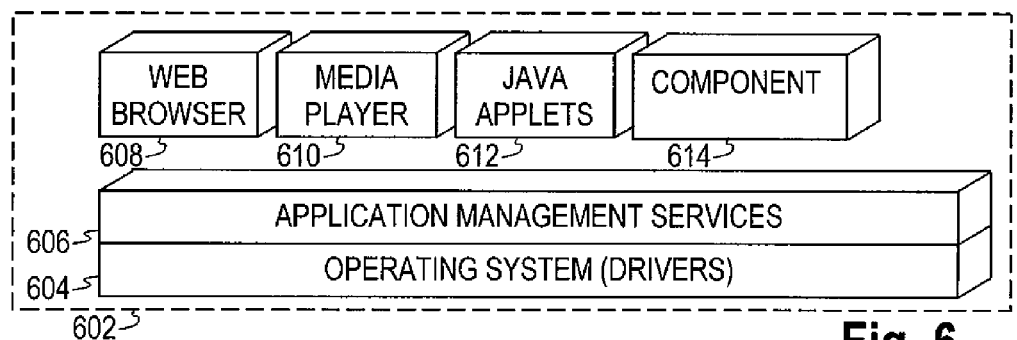
FIG. 6 is a diagram of a software environment that may be implemented on a user agent operable for some of the various embodiments of the disclosure.

FIG. 6 illustrates a software environment 602 that may be implemented by the DSP 502. Alternatively, the software environment 602 can be executed in an execution environment hosted by the CPU 1310 on the UA 110 or by a logical CPU with a combined DSP function. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UA 110, monitor applications, preempt applications, and perform other functions of an underlying operating system platform such as controlling, monitoring, and sometimes preempting or terminating logical processes, including execution threads.

Also shown in FIG. 6 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. The AMS 606 may also host a Java Virtual Machine on which the Java applets 612 can execute. Other execution environments could also be hosted, such as a C runtime environment to support executable programs and applications written in the C programming language. A component 614 might provide functionality related to persistent sessions.

Figure 7:
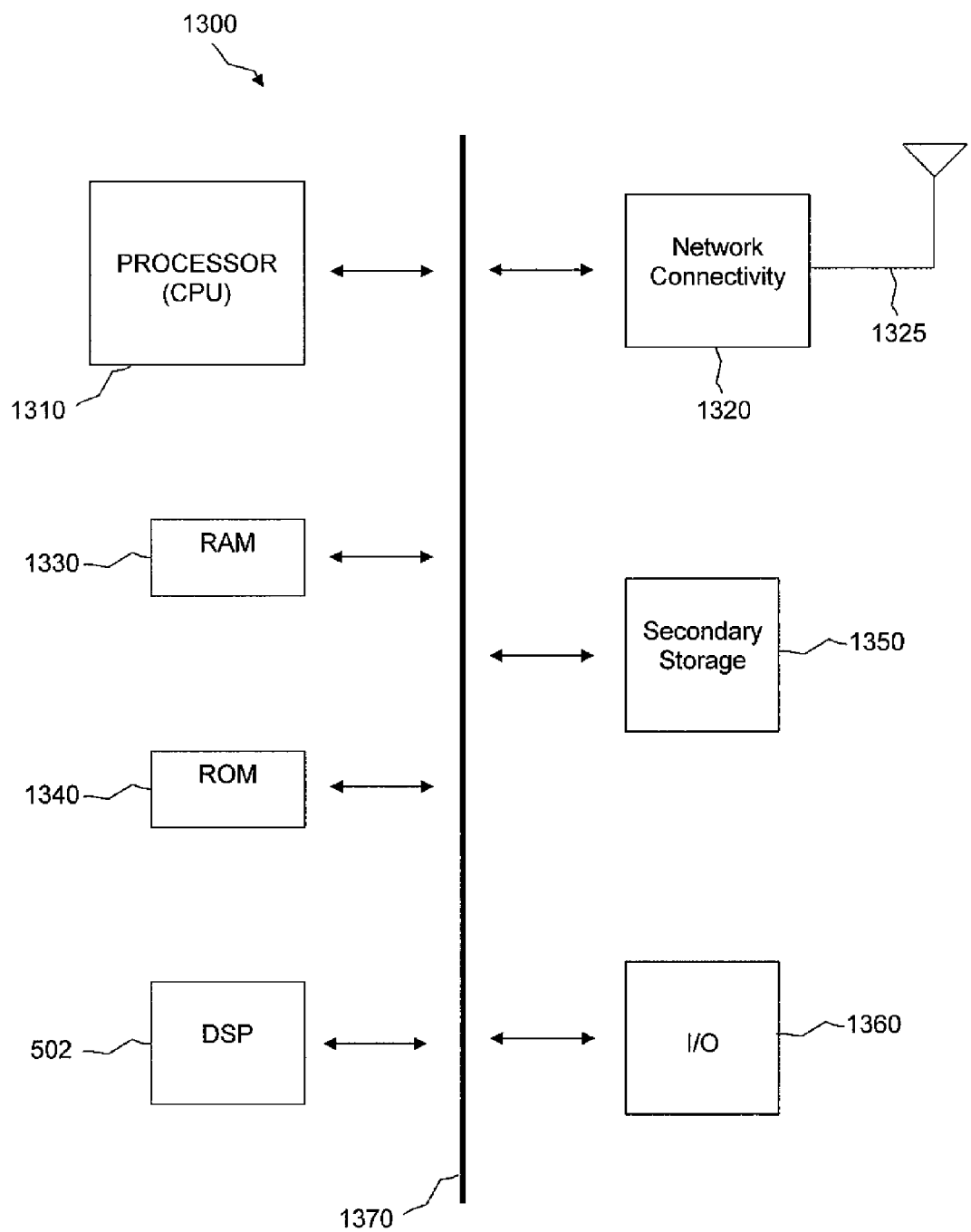
FIG. 7 illustrates a processor and related components suitable for implementing the several embodiments of the present disclosure.

The UA 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as the DSP 502 described above. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips. The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) and/or global system for mobile communications (GSM) radio transceiver devices, and other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

Additional information related to the presence access layer and other topics discussed herein can be found in the following documents, which are incorporated herein by reference as if reproduced in their entirety: U.S. Provisional Patent Application No. 61/013,813, filed Dec. 14, 2007, by Brian McColgan, et al, entitled "Method and System for a Context Aware Mechanism for Use in Presence and Location"; U.S. Provisional Patent Application No. 61/013,827, filed Dec. 14, 2007, by Brian McColgan, et al, entitled "Method and System for a Context Aware Mechanism in an Integrated or Distributed Configuration"; and U.S. Provisional Patent Application No. 61/013,834, filed Dec. 14, 2007, by Brian McColgan, et al, entitled "Method and System for Specifying, Applying and Executing Application Related Aspects through Policies, Rules and/or Triggers".

In an embodiment, a method for a watcher to receive presence information is provided. The method includes the watcher requesting presence information from a presence access layer and then disconnecting from the presence access layer. The method further includes the presence access layer receiving the requested information through a persistent session with a presence server, storing the requested information, and delivering the requested information to the watcher after the watcher reconnects to the presence access layer.

In an alternative embodiment, a system is provided. The system includes a presence access layer configured to receive a request from a watcher for presence information. The presence access layer further is configured to maintain a persistent session with a presence server after the watcher disconnects from the presence access layer. The presence access layer is further configured to receive the requested information from the presence server through the persistent session, store the requested information, and deliver the requested information to the watcher after the watcher reconnects to the presence access layer.

In an alternative embodiment, a method for a recipient to receive presence information is provided. The method includes a watcher requesting presence information from a presence access layer, the watcher disconnecting from the presence access layer, the presence access layer receiving the requested information through a persistent session with a presence server, the presence access layer storing the requested information, and the presence access layer delivering the requested information to the recipient.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A non-transitory computer readable medium storing instructions which are configured to cause a computing device to execute a server that performs a method comprising:
   receiving a request from a watcher for a presence aspect derived from presence information associated with a presentity;
   subscribing on behalf of the watcher, based on the request that was received, with a presence server to receive the presence information associated with the presentity;
   processing complex presence information that is received from the presence server based on the subscribing to determine a single value of the presence aspect which is an abstraction or consolidation of the complex presence information; and
   transmitting the single value to the watcher instead of the complex presence information;
   wherein the presence aspect relates to at least one of the presentity's availability to communicate and the presentity's willingness to communicate, and wherein the single value is "true" or "willing" for affirmative willingness, "false" or "unwilling" for negative willingness, "true" or "available" for affirmative availability, and "false" or "unavailable" for negative availability.

2. The non-transitory computer readable medium of claim 1 wherein the presence aspect facilitates consolidation or abstraction of the complex presence information.

3. The non-transitory computer readable medium of claim 1 wherein the complex presence information is a document in Presence Information Data Format (PIDF).

4. The non-transitory computer readable medium of claim 1 wherein the complex presence information is a document in Rich Presence Information Data (RPID) format.

5. The non-transitory computer readable medium of claim 1 wherein the complex presence information is an XML document.

6. The non-transitory computer readable medium of claim 1 wherein the presence aspect relates to a communication application or communication service for which the presentity has opted-in.

7. The non-transitory computer readable medium of claim 6 wherein the opted-in communication application or communication service is instant messaging or push-to-talk.

8. A server comprising:
   a communication device configured to receive a request from a watcher for a presence aspect derived from presence information associated with a presentity; and
   a processor configured to: subscribe on behalf of the watcher, based on the request that was received, with a presence server to receive the presence information associated with the presentity; and process complex presence information that is received from the presence server based on the subscribing to determine a single value of the presence aspect which is an abstraction or a consolidation of the complex presence information, wherein the communication device is further configured to transmit the single value to the watcher instead of the complex presence information;
   wherein the presence aspect relates to at least one of the presentity's availability to communicate and the presentity's willingness to communicate, and wherein the single value is "true" or "willing" for affirmative willingness, "false" or "unwilling" for negative willingness, "true" or "available" for affirmative availability, and "false" or "unavailable" for negative availability.

9. The server of claim 8 wherein the presence aspect facilitates consolidation or abstraction of the complex presence information.

10. The server of claim 8 wherein the complex presence information is a document in Presence Information Data Format (PIDF).

11. The server of claim 8 wherein the complex presence information is a document in Rich Presence Information Data (RPID) format.

12. The server of claim 8 wherein the complex presence information is an XML document.

13. The server of claim 8 wherein the presence aspect relates to a communication application or communication service for which the presentity has opted-in.

14. The server of claim 13 wherein the opted-in communication application or communication service is instant messaging or push-to-talk.

15. A user equipment comprising:
- a communication subsystem configured to: transmit a request to a server, which is different from and in communication with a presence server, for a presence aspect derived from presence information associated with a presentity; and receive, based on the request, a single value of the presence aspect from the server rather than a presence document from the presence server; and
- a processor configured to execute a watcher agent operable to use the single value of the presence aspect that is received for a presence-enabled application or presence-enabled service being employed by the user equipment, wherein the presence document has a format selected from the group consisting of Presence Information Data Format (PIDF), Rich Presence Information Data (RPID) and XML;
- wherein the presence aspect relates to at least one of the presentity's availability to communicate and the presentity's willingness to communicate, and wherein the single value is "true" or "willing" for affirmative willingness, "false" or "unwilling" for negative willingness, "true" or "available" for affirmative availability, and "false" or "unavailable" for negative availability.

16. The user equipment of claim 15 wherein the request specifies an interest in a communication application or service for which the presentity has opted-in.

17. The user equipment of claim 16 wherein the opted-in communication application or service is instant messaging or push-to-talk.

\* \* \* \* \*